July 14, 1953  D. D. R. MACKINTOSH  2,644,964
NIPPLE THREADING MACHINE
Filed Feb. 23, 1949  3 Sheets-Sheet 1
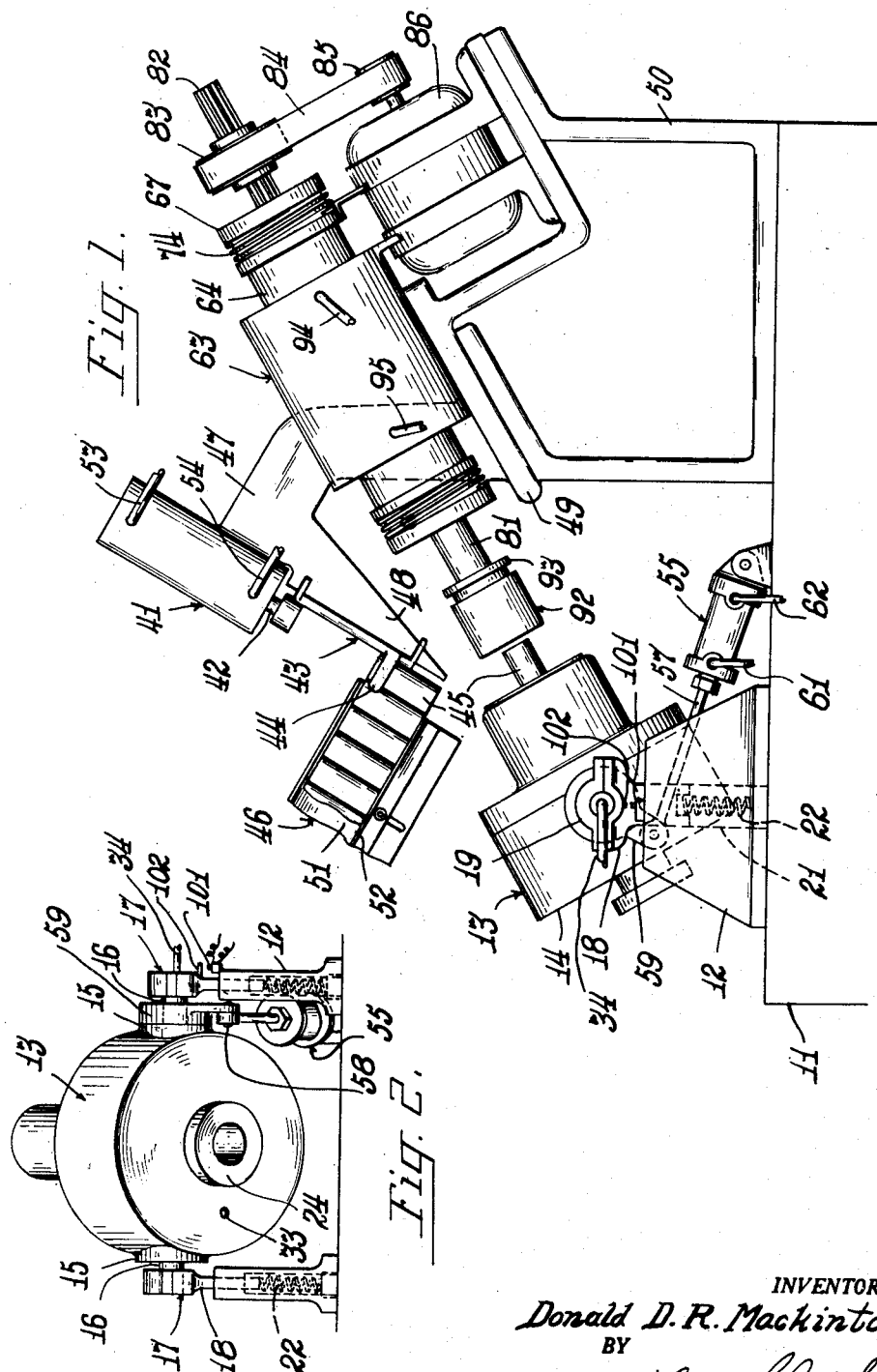
INVENTOR.
Donald D. R. Mackintosh
BY
ATTY.

July 14, 1953  D. D. R. MACKINTOSH  2,644,964
NIPPLE THREADING MACHINE
Filed Feb. 23, 1949  3 Sheets-Sheet 2
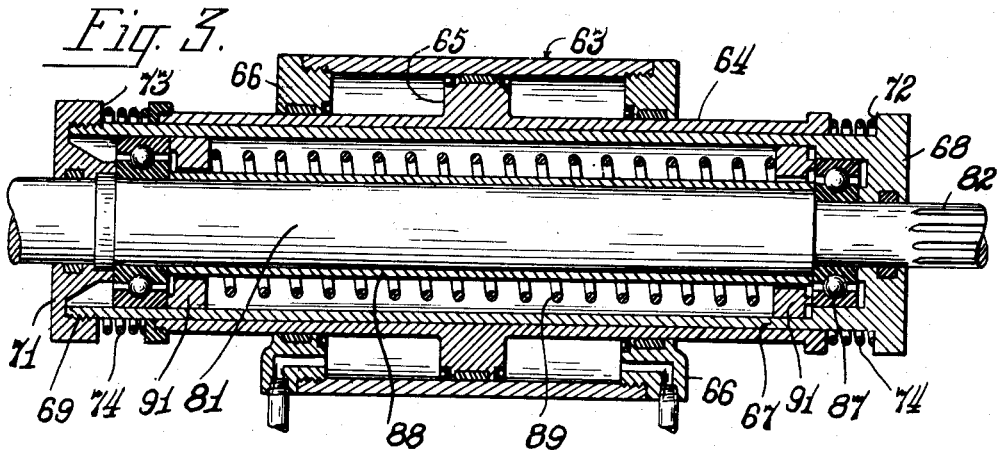
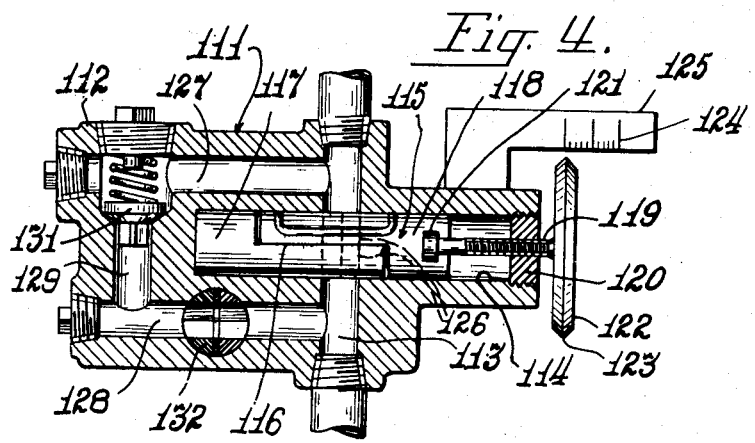
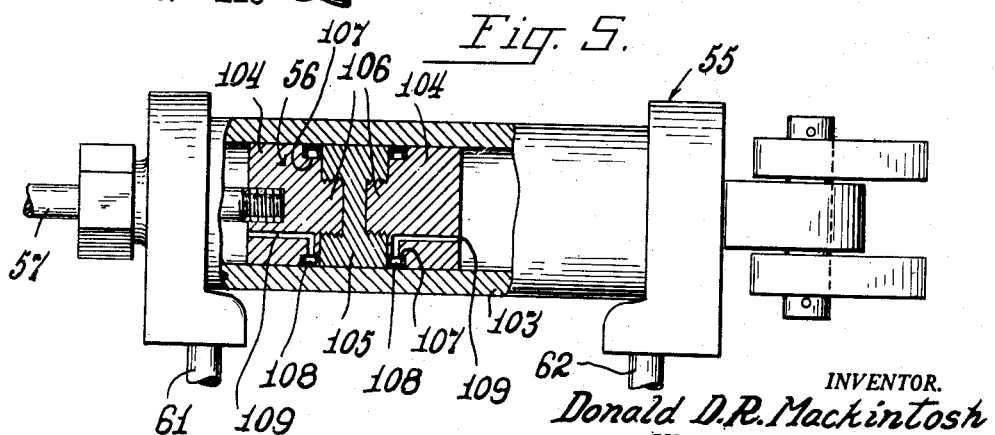
INVENTOR.
Donald D. R. Mackintosh
BY
Elmer L. Zwickel
ATTY.

July 14, 1953 D. D. R. MACKINTOSH 2,644,964
NIPPLE THREADING MACHINE
Filed Feb. 23, 1949 3 Sheets-Sheet 3
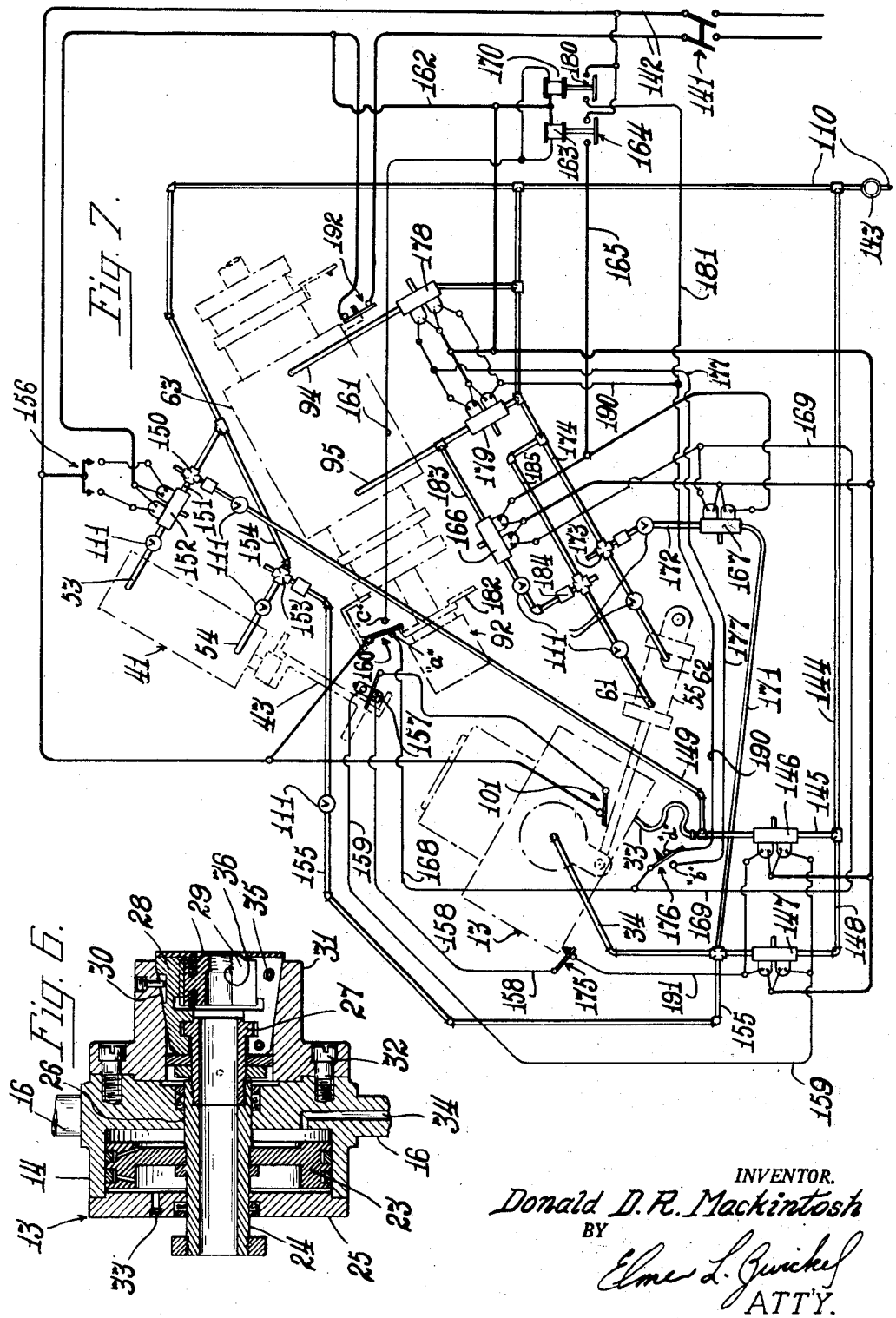
INVENTOR.
Donald D. R. Mackintosh
BY
Elmer L. Zwickel
ATT'Y.

Patented July 14, 1953

2,644,964

UNITED STATES PATENT OFFICE 2,644,964

NIPPLE THREADING MACHINE

Donald D. R. Mackintosh, Chicago, Ill.

Application February 23, 1949, Serial No. 77,720

6 Claims. (Cl. 10—105)

The invention relates to improvements in threading machines and more particularly to an automatic nipple feeding, threading and delivery apparatus. The invention is more particularly concerned with wholly automatic threading apparatus of a kind wherein the nipples or like work pieces are fed into a holding chuck which clamps the nipple and holds it firmly in a position to receive thereover a rotating threading head which is advanced over the nipple during the threading operation and withdrawn therefrom at the completion of the threading operation.

The machine of the present invention embodies novel structural details and a novel association of operating parts and control elements tending to enable full automatic operation. It is therefore an object of the invention to provide such a machine.

Another object is to provide a threading machine with a novelly mounted chuck adapted to absorb torque and to cause machine stoppage when excessive torque is created.

Another object is to provide a novelly constructed fluid motor and threading head mounting assembly.

Another object is to provide a novel piston and sealing ring construction.

Another object of the invention is to provide, in a fluid-controlled threading machine, novelly constructed flow control valves.

Another object is to provide a novel fluid operated feed mechanism for supplying nipples to a chuck.

Another object is to provide a nipple-threading machine with novel electrically actuated interlocking control mechanisms operable to actuate various parts thereof at selected intervals and for predetermined periods of time.

Another object is to provide a nipple-threading machine in which the threading heads are advanced in one direction at a rate of speed different from the speed of return.

Another object is to provide a novel automatic nipple-threading machine with novel means to expedite the threading of nipples automatically fed thereto during the automatic threading operation.

Another object is to provide a nipple-threading machine in which the threading head is positively fed to the nipple at a predetermined rate of speed during the threading operation, so that the threads are accurately formed thereon.

Another object is to provide a nipple-threading machine in which all the steps of nipple-feeding, chucking, threading, un-chucking and discharge are performed automatically and in timed sequence.

Another object of the invention is to provide a nipple threading machine with novel valve means to control the flow of air to and from operating cylinders therein.

Another object is to provide an automatic machine of the character described which is inexpensive to construct, simple to operate and highly efficient and accurate in operation.

Other and further objects of the present invention will be apparent from the following description and claims and are illustrated in the accompanying drawings. Other embodiments of the invention embodying the same principle may be used, and structural changes may be made as desired by those skilled in the art, without departing from the present invention and the purview of the appended claims.

In the drawings:

Fig. 1 is a side elevational view of a threading machine embodying features of the present invention, omitting the fluid lines, control valves and electrically controlled elements.

Fig. 2 is an end elevational view of the chuck.

Fig. 3 is a longitudinal central sectional view of the threading head air motor.

Fig. 4 is a central sectional view through one of the flow-regulating valves, showing parts in elevation.

Fig. 5 is an elevational view, partly in section, of the air motor provided for turning the chuck.

Fig. 6 is a longitudinal sectional view through the chuck.

Fig. 7 is a schematic view of the fluid supply lines and control valves, showing the electrical wiring and control switches associated therewith, the machine parts being illustrated in broken lines.

The machine of the present invention is particularly designed to effect automatic threading of nipples or like work pieces. It includes a suitable magazine adapted to deliver work pieces to automatic feed means operable to carry said work pieces into position for engagement by a holding chuck which subsequently is moved into a position so that a rotating threading head may advance over one end of the work piece to thread the same. In the present machine the threading head is actuated in such manner as to cause it to return to its initial position upon completion of the threading operation. When the threading head returns to its initial position the chuck is carried back into its work feeding position, at which time the threaded work piece therein is released and discharged, and another piece is delivered thereto.

Referring particularly to the accompanying drawings and especially to the Fig. 1 disclosure, the machine of the present invention is suitably mounted upon a bed 11. A pair of spaced-apart vertical standards 12 are firmly mounted upon the base 11, and are intended to provide bearing means for a chuck 13. The chuck 13 may be of any conventional automatic work-engaging structure, but it is preferred that it embody the novel structure illustrated in Fig. 6, and which will be described more fully presently.

It is sufficient to note at this time that the chuck 13 includes a cylindrical body 14, having diametrically opposed bosses 15 and trunnions 16 projecting outwardly therefrom on either side thereof. The trunnions 16 are journaled for free rotation in bearing blocks 17, slideably mounted in the standards 12. As best shown in Figs. 1 and 2, each bearing block includes a substantial T-shaped element 18 and a bearing cap 19. The depending portions of the T-shaped elements 18 are slideably mounted, one in a vertical guide 21 provided in each standard 12. The guides 21 are of sufficient depth to extend substantially to the bottom of respective standards 12 so as to provide chambers to receive compression springs 22 interposed between the bottom of the standards 12 and the lower ends of the depending portions of the T-shaped members 18.

It should be quite apparent at this time that the springs 22 normally retain the bearing elements 17 in a predetermined position of elevation, so that the chuck 13 is thereby suitably journaled in horizontally-aligned bearings so as to be tilted on a horizontal axis during machine operation. The yieldable mounting for the chuck 13 is provided for purposes to be explained presently.

Referring to Fig. 6 of the drawing, it will be observed that the body 14 of the chuck 13 is substantially hollow and receives within the hollow portion thereof a piston 23 firmly secured on an axial sleeve 24. One end of the sleeve 24 projects through a cap plate 25, and its other end has a slidable fit in the forward end of the chuck housing 14, as at 26. The last-named end of the sleeve 24 is internally recessed and tapped to receive a tubular extension 27 which is operably associated with a plurality of chuck jaws 28 having grippers 29 slidably associated therewith. The jaws 28 have tapered outside surfaces which cooperate with the internal conical surface 30 of a jaw housing 31 firmly mounted on the closed end of the housing 14 as by means of bolts 32.

The chuck structure described hereinabove is of a kind that is actuated by fluid pressure, and accordingly, it is provided with a fluid inlet 33 in the cap plate 25 communicating with the interior of the housing 14 on one side of the piston 23 and a fluid inlet 34 which communicates with housing space on the other side of the piston 23. In operation, fluid under pressure is admitted initially through the inlet 34 into the "closing" side of the housing interior to urge the piston 23 in the direction of the cap plate 25. Movement of the piston in this direction carries the sleeve 24 and its extension 27 rearwardly so as to draw the jaws 28 into the jaw housing 31, whereupon said grippers are contracted radially to firmly grip a work piece inserted therein. To release the work piece, the forward or "closing" side of the housing is opened to atmosphere and fluid under pressure is admitted through the inlet 33 into the "opening" side of the housing interior to urge the piston forwardly in the opposite direction. This movement carries the jaws 28 forwardly, whereupon the grippers 29 return to their initial spread position by reason of springs 35 to release the work piece. When the chuck is tilted as shown in broken lines in Fig. 7 the freed work piece then drops downwardly through the sleeve 24 onto a suitable conveyor or other means provided for the reception of such pieces. The grippers 29 preferably are provided with threads 36 on their inside faces so as to facilitate the gripping of work pieces or nipples having threaded ends inserted into the chuck.

The work pieces are fed to the chuck 13 while the chuck is in the position illustrated in broken lines in Fig. 7. Suitable automatic means is provided for delivering said work pieces. As best shown in Fig. 1, said means preferably includes an air motor 41 having a piston, operable therein, provided with a piston rod 42 extending through one end thereof. A work piece engaging and feeding element 43 is carried on the projecting end of the piston rod 42. As shown, the element 43 is elongated and is provided on its free end with spring jaws 44 to embraceably engage a work piece 45 delivered thereto from a magazine 46. The work piece feeding mechanism is supported in the angular position illustrated, and in axial alignment with the axis of the chuck 13, when the latter is positioned as shown in Fig. 7, by a bracket 47. A forwardly projecting arm 48 on said bracket is disposed to underlie the work piece engaging element 43 to afford a slideable mounting and support therefor. The bracket 47 may be formed integrally with a substantially S-shaped base plate 49, firmly secured, as by means of bolts or other anchoring devices, to the upper end of a bracket 50 firmly supported on the base 11.

The work piece magazine 46 may be of any conventional construction. However, it is preferred that it include a chute 51 disposed in a vertical plane and provided with an adjustable bottom wall 52 so as to adapt it to accommodate work pieces of various lengths. The work pieces 45 are fed by gravity downwardly in the magazine 46 and are successively engaged, during machine operation, by the spring jaws 44 and are carried downwardly and seated in the chuck opening. Movement of the work piece feeding element 43 into its various operative positions is accomplished by admitting fluid under pressure, successively, into opposed ends of the fluid motor 41. To this end, the fluid motor has fluid lines 53 and 54 communicating with opposite ends thereof.

When a work piece has been positioned in the chuck 13 the work piece carrying element 43 is disengaged therefrom and withdrawn, in a manner to be described presently, whereupon the chuck is rocked on its horizontal axis from the work piece feeding position into the work piece threading position shown in full lines in Fig. 1. Such movement of the chuck 13 is accomplished by means of a fluid motor 55, which includes a piston 56 (Fig. 5) having its piston rod 57 connected, at its free end, as at 58, to an arm 59 firmly secured to and depending from one of the chuck trunnions 16. The fluid motor 55 is designed to have a predetermined stroke in both directions. Consequently, the piston is located at either end of said motor when the chuck is in either one of its two positions of adjustment. Fluid is delivered selectively to either end of the fluid motor 55, through inlet lines 61 and 62.

The apparatus includes automatic means for threading the projecting end of the work piece when the chuck is in the position shown in Fig. 1. As there illustrated, such means includes a cylindrical housing 63 formed integrally with or otherwise firmly secured to the base plate 49 in axial alignment with the chuck when the latter is in the position illustrated. A cylindrical piston 64, best shown in Fig. 3, is mounted for longitudinal reciprocation in the cylindrical housing 63. Upon reference to Fig. 3, it will be noted that the cylindrical piston 64 includes a medial circumferential enlargement 65 provided with piston rings so as to have an airtight sliding fit within the cylindrical housing 63. Circular end walls 66, screw-threaded into opposed ends of the housing 63, provide a hermetic seal at the housing ends so as to prevent the escape of fluid delivered to the interior of the housing 63 for moving the piston 64 in either direction longitudinally.

A tubular bushing 67 is mounted snugly within the cylindrical piston 64. This bushing is longer than the piston 64 and is closed at one end as by means of an integral end wall 68. It is provided on its other end with external threads 69 to receive and secure a cap ring 71 thereon. The end wall 68 and the cap ring 71 are of larger external diameter than the diameter of the tubular bushing 67 so as to afford shoulders 72 and 73 opposed to the respective ends of the cylindrical piston 64. Coil springs 74 are interposed between the piston ends and said shoulders to afford means whereby the tubular bushing 67 may shift longitudinally relative to the cylindrical piston 64 when pressure is applied endwise to the bushing. This structure affords means whereby any excessive thrust on the tubular bushing may be absorbed without shock.

The bushing end wall 68 and cap ring 71 are provided with axial openings through which a shaft 81 extends. This shaft is reduced at one end, as at 82, and receives slidably thereon a pulley 83 (Fig. 1) connected by a belt 84 to a driven pulley 85 carried on the shaft of a motor 86 firmly secured upon the base plate 49. This structure affords means whereby the shaft 81 may be rotated during machine operation and shifted longitudinally with the cylindrical piston 64 relative to housing 63. Anti-friction thrust bearings 87 are provided at each end of the tubular bushing 67 and are retained in place by a sleeve 88 carried on the shaft 81 and having its ends in tight abutment with the inner races of said bearings. A compression spring 89, surrounding the sleeve 88, bears against collars 91 so as to urge said collars tightly against the outer bearing races.

The end of the shaft 81 extending through the cap ring 71 carries a threading head generally indicated at 92. This threading head may be of any conventional and well-known structure including means in the form of a reciprocal collar 93 adapted to be urged outwardly when the threading head reaches the limit of its threading operation. Inasmuch as the construction of threading heads of this kind is well known, it is thought to be sufficient to note at this time that it includes threading dies which, when carried downwardly during head rotation over the projecting end of the work piece, thread said projecting end.

In operation, the threading head 92 is positioned substantially as shown in Fig. 1. When the chuck 13 is positioned to locate the work piece in axial alignment therewith, fluid under pressure is admitted into what might be termed the "advancing" end of the cylindrical housing 63 through a fluid line 94, whereupon the piston 64 and shaft 81 are moved forwardly to carry the threading head downwardly over the work piece. As soon as the predetermined amount of threading of the work piece has been accomplished, the threading head collar 93 is actuated to actuate means to be described presently for venting the "advancing" end of the cylindrical housing 63 and admitting fluid under pressure into the "return" end of said housing through a fluid line 95. The admittance of fluid into the return end of housing 63 carries the piston 64 in the opposite direction to thereby withdraw the head 92 from over the work.

Under certain conditions of operation, as when the threading dies have been dulled or when the work pieces possess excessive hardness, considerable resistance to threading is encountered. This necessarily results in imparting excessive torque to the chuck 13. In order to avoid damage to either the threading head 92 or chuck 13, means is provided in the present construction whereby continued operation of the machine is prevented. Such means includes a torque switch 101 which is connected, in a manner to be described hereinafter, in the electric control circuit for the machine. The torque switch 101 preferably is carried on the upper end of one of the standards 12 and is adapted to have its switch element actuated when engaged by a surface, such as the surface 102 of one of the yieldably mounted bearing blocks 17.

The chuck rocking fluid motor 55 preferably is constructed in the manner best illustrated in Fig. 5. As there shown, it includes a cylindrical housing 103 within which the piston 56 operates. The piston 56 comprises a built-up structure consisting of end elements 104 and an intermediate element 105. The intermediate element may be tapped on opposed faces to receive externally-threaded studs or bosses 106 formed integrally with each end piece 104 whereby the three elements are formed into an integral unit.

This three-piece construction preferably is adapted in order to facilitate machining of circumferential recesses 107 on each end element, and reception therein of internally channeled pliable piston rings 108. The ring channels are each placed in commuciation with an end of the cylindrical housing 103, as by means of fluid passageways 109. This construction affords means whereby fluid admitted under pressure into either end of the housing 103 is conveyed to the channel in one of the piston rings 108, so as to expand said piston ring laterally and radially to insure a hermetic seal.

Air lines to all of the fluid motors are connected, through auxiliary headers and conduits to be specifically identified hereinafter, with a main fluid line 110. Certain of said lines are, as shown in Fig. 7, provided at selected locations with flow control valves 111, preferably of a kind best shown in Fig. 4. These valves are designed to permit rapid flow of fluid in one direction and restricted flow in the opposite direction.

Specifically, the valve 111 includes a cast body 112 provided with a diametrical passage 113 tapped at its end to receive, in threaded connection therewith, pipe lines for connecting the valve in fluid lines. The diametrical passageway 113 is intersected by a bore 114 having a manually controlled valve element 115 operable therein. In the present disclosure the valve element consists of a two-piece cylindrical body having opposed flat surfaces 116 formed by back-cutting each piece 117 and 118 of the valve element. The valve piece 117 is of sufficient diameter as to have a snug friction-tight fit in the bore 114. The other piece 118 is slidable in the bore 114, such movement being accomplished preferably by means of a threaded stem 119 extending through a cap plug 120 and being rotatably connected as at 121 to said valve piece. A hand wheel 122 on the projecting end of the stem 118 affords means whereby the stem may be easily rotated manually.

It is preferred that the periphery of the hand wheel 122 be tapered on opposed edges to provide a knife-like circumference 123 adapted to co-act with guage markings 124 on a guage 125 firmly secured to the valve body. Thus it is apparent that the valve piece 118 may be adjusted relative to the valve piece 117 to any predetermined degree ascertained upon reference to guage markings 124.

Adjustment of the valve piece 118 relative to the valve piece 117 is provided so as to regulate the flow of fluid through the passageway 113. As illustrated, each valve piece 117 and 118 is provided with a substantially square or non-circular opening 126. When in register, these openings permit the passage of a maximum amount of fluid through the passage 113. When the valve piece is moved with relation to the valve piece 117, the previously aligned square openings 126 therein are carried out of alignment so as to thereby afford a restricted opening through which fluid may pass. It should be apparent that the provision of valves 111 in selected fluid lines provides means whereby the flow of fluid under pressure may be controlled for efficient machine operation.

The valves 111 also embody means whereby the rate of flow of fluid in one direction may differ from the rate of flow in the other direction. Accordingly, each valve 111 includes longitudinal bores 127 and 128, each communicating at one end with the passageway 112. The other ends of said bores are placed in communication through a bypass 129. A check valve 131 arranged in said bypass permits the flow of fluid through the bores 127 and 128 and bypass 129 in one direction only. A valve element 132, of a kind like the valve element 115 is provided in the bore 128 to regulate the flow of fluid therethrough. The construction of the valve 111 is, accordingly, such that fluid can flow directly therethrough at a predetermined volume, in one direction, and through a controlled bypass at a different volume, in the other direction.

The specific arrangement and association of the various valves, fluid motors and control devices, including the electrical control circuit, may best be described while describing the operation of the machine.

Operation

To place the apparatus in condition for operation, the feed magazine 51 is stocked with work pieces. The main switch 141 in the main electric supply lines 142 is closed. A main valve 143 in the fluid supply line 110 is opened, thus admitting fluid under pressure into a cross line 144 communicating through a lead-in-line 145 and solenoid valve 146 which is open, at this time, to the inlet 33 on the "opening" side of the chuck 13. A solenoid valve 147 in the extension 148 of pressure line 144 leading to the inlet 34 on the "closing" side of the chuck is closed at this time to the passage of fluid and is positioned to vent the "closing" side of the chuck to atmosphere. Thus, the jaws of the chuck are held open to receive a work piece.

Actual feeding of a work piece 45 from the feed magazine 51 to the chuck is effected by actuation of the feed mechanism 43 through operation of its fluid motor 41. Accordingly, opening of the main valve conditions the fluid motor for operation. Thus, pressure in the fluid line 145 leading to the chuck inlet 33 is transmitted through a control line 149 to a closed delay action valve 150 located in pressure line 151 connected to the inlet 53 to the "advancing" end of the fluid motor 41. A solenoid valve 152, inserted in line 151 between the delay action valve 150 and the inlet 53, is closed to the passage of fluid at this time. Simultaneously with the opening of delay action valve 150, a delay action valve 153 in the pressure line 154, communicating with the inlet 54 on the "return" end of the fluid motor 41, is vented to atmosphere because of the negative pressure in its pressure control line 155 leading from the line 144 beyond the vented solenoid valve 147.

With the solenoid valves 146, 147 and 152 and the delay action valves 150 and 153 in the positions indicated, actual operation of the machine is initiated by closing a starting switch 156 so as to condition the solenoid valve 152 to admit fluid pressure into the "advancing" end of the fluid motor 41. The rate of advance of the piston in said fluid motor to carry a workpiece into the chuck may be regulated by the setting of the flow regulator valve 111 in the inlet 53. When the workpiece 45 is thrust into the open chuck the required distance, a double-throw switch 157 is actuated by the carrier 43 and is reversed. This cuts off the current supply through conduit 158 to the side of the valves 146 and 147 which were energized initially and energizes the other sides of said valves through conduit 159 to reverse the positions of the elements therein. Thus the solenoid valve 146 is vented to atmosphere and pressure is flowed through solenoid valve 147 into the inlet 34 on the "closing" side of the chuck so as to close its jaws and grip the workpiece firmly. At the same time, the pressure on the delay action valves 150 and 153 to close valve 150 and open valve 153 through lines 149 and 155 is reversed, thus venting the "advancing" end of the fluid motor 41 and admitting fluid pressure through inlet 54 to the "return" end. The feed mechanism is, accordingly, returned to its initial position.

It should be observed at this time that a switch 160, associated with the threading head 92, is positioned to maintain an electric circuit open through lines 161—162 so that a relay 163 in said lines is de-energized to hold a switch 164 in line 165 open to de-energize one side of solenoid valves 166 and 167. The other side of each valve 166 and 167 is energized by current flowing through terminal a of switch 160 and lines 168 and 169. With the circuit established, valve 167 is open to fluid pressure in the line 171, while valve 166 is vented to atmosphere. Accordingly, fluid under pressure is admitted into line 172 to actuate a delay action valve 173 in a pressure line 174 leading from the fluid supply to inlet 62 on the "advancing" end of fluid motor 55. This pressure, entering the fluid motor 55 behind its piston 56, moves said piston and its rod 57 forwardly to rock the chuck in its mounting to position it in working position.

Initial rocking of the chuck into working position opens a switch 175 to break the electric circuit through lines 158—191 to prevent reversal, at this time, of the positions of the valve elements in valves 146 and 147 which would occur because of the reversal of switch 157 at the end of the return stroke of the feeding mechanism 43. Upon completion of the movement of the chuck into operating position, switch 176 is engaged thereby and reversed, thus energizing line 177, through switch terminal 176 b, and opening solenoid valve 178 to pressure and venting valve 179 to atmosphere. This admits fluid pressure through inlet 94 behind the piston in fluid motor 63, to cause the head 92 to advance over the work and perform the threading operation.

As stated hereinabove, the operating head 92 is of a type that opens when the threading has been performed for the required distance. When this occurs, the collar 93 thereon moves outwardly and strikes the control of switch 160 to open the circuit through terminal a and lines 168—169 and line 177, and to close the circuit through switch terminal 160 c and energize line 161. Current flowing through line 161 energizes the relay 163 and closes switch 164 in line 165 for purposes to be described presently. A second relay 170 is connected in parallel with relay 163 so as to open and close a switch 189 simultaneously therewith. The stoppage of current flow through line 177, upon reversal of switch 160, and its flow through relay switch 180 and lines 181 and 190 reverses the positions of the valve elements in solenoid valves 178 and 179, thus venting valve 178 to atmosphere and admitting pressure through valve 179 and inlet 95 to the "return" end of fluid motor 63. The head 92 then begins its return to starting position.

When the relay switch 180 was closed to start the return movement of the threading head, the relay switch 164 was also closed. Closing of this switch 164 energized line 165 connected with valves 166 and 167, so as to open the valve 166 to operating pressure delivered thereto through fluid line 183, and to vent valve 167 to atmosphere. Pressure admitted through valve 166 acts upon a delay action valve 184 in pressure line 185 to open said valve and admit pressure to the forward end of the fluid motor 55 through inlet 61. Venting of valve 167 causes the delay action valve in line 174 to vent the atmosphere. This relieves the pressure behind the piston in fluid motor 55 and permits said piston to return to its initial position, thus rocking the chuck 13 back into workpiece-receiving position. The initial return movement of the chuck is delayed because of the delay action valves 173 and 184 and flow control valves 111 in the fluid motor lines 61 and 174, thus giving the working head ample time to back off of and clear the workpiece.

Initial return movement of the chuck to loading position reverses the switch 176 to move its contact blade from terminal b to terminal d to which line 190 is connected. Thus, when the threading head reaches its initial starting position, at which time switch 160 is again reversed to de-energize the relays 163 and 170, current will flow through switch 160, terminal a, line 168, switch 176, its terminal d and line 190. As a result, pressure is maintained through inlet 95 and the threading head mechanism remains immovable until such time as the switch 176 is again reversed by movement of the chuck into threading position.

Return of the chuck to loading position closes the switch 175, which energizes line 191 to valve 146 and 147, so as to reverse the positions of the elements therein, whereupon the valve 147 is vented to atmosphere and the valve 146 admits pressure through inlet 33 to open the chuck jaws. When the chuck jaws are opened, the workpiece is free to slide through the opening therein and may be deposited in a receptacle or on a conveyor operative to carry the workpiece to a companion threading machine operable to thread the other end of the nipple.

It should be observed that, with pressure restored to the "opening" side of the chuck, pressure is restored to the line 149 so as to open delay valve 150, whereupon pressure is admitted into the "advancing" end of feed fluid motor cylinder 41 to initiate the repeat cycle of operation.

In the event the threading operation creates an excessive torque on the chuck 13, means is provided in the form of the cutout switch 101 to stop operation until such excessive load is overcome. To this end, the switch 101 is mounted on the vertical support 12, and is closely associated with one of the spring-mounted bearing elements 18. Thus, when excessive torque causes the chuck to rock downwardly in the direction of rotation of the threading head, the switch is opened to cut the current supply to control switch 157.

A safety switch 192 also is provided on the threading head fluid motor, which switch is actuated to cut the main current supply when the threading head advances over the workpiece a distance greater than that required or desired.

From the foregoing, it should be quite evident that nipples or other workpieces may be quickly threaded by operation of the machine disclosed herein; and that the specific valve structures and air motors, and particularly the air motor construction illustrated in Fig. 3, are readily adapted for use in connection with apparatus of a kind other than that described. It should be understood further that nipples or workpieces having one end threaded, as by the machine illustrated, may be discharged from the chuck and conveyed to a companion machine in such manner as to be delivered thereto with their unthreaded ends projecting from the chuck thereof so as to be suitably threaded in said companion machine.

Although an exemplary embodiment of the present invention is disclosed in the accompanying drawings and described in detail in the foregoing specification, it should be understood that the invention is capable of embodying a variety of modifications including the employment, in association therewith, of an air chuck of other conventional construction, without departing from the spirit of the invention and the scope of the appended claims.

I claim:

1. In a nipple threading machine, a chuck adapted to hold a work piece, a rotatable shaft carrying a threading head, yieldable supports for said chuck, means pivotally mounting said chuck on said supports so that the chuck may rock to carry the work piece into and out of axial alignment with the rotatable shaft, means actuable when the work piece moves into alignment with the shaft to rotate the shaft and threading head, means to advance and retract the threading head toward and away from the work piece when the latter is in alignment therewith, and means actuable upon yielding of a chuck support in response to excessive torque imparted to the chuck effective to stop the advance of the threading head.

2. In an electrically controlled nipple the threading machine, a rotatable threading head, a chuck pivoted on a horizontal axis, means to deliver a work piece to be threaded to said chuck, an electrically controlled fluid motor to operate said means, a fluid motor operable to move the chuck from its work piece receiving position into position to align the work piece with the rotating threading head, electrically actuated control means for said chuck-moving motor actuable upon completion of the work piece feeding operation to start said motor, a third fluid motor operable to advance the threading head over the work piece and to return it to its initial position when the threading operation is completed, electrically actuated control means for threading head fluid motor actuable to start said motor when the chuck moves into alignment with the head, and switch means engageable by and effective when the head approaches its initial position to actuate the chuck-moving motor and return the chuck to work piece receiving position.

3. In an electrically controlled nipple threading machine, a rotatable threading head, a chuck pivoted on a horizontal axis, means to deliver a work piece to be threaded to said chuck, an electrically controlled fluid motor to operate said means, a fluid motor operable to move the chuck from its work piece receiving position into position to align the work piece with the rotating threading head, electrically actuated control means for said chuck moving motor actuable upon completion of the work piece feeding operation to start said motor, a third fluid motor operable to advance the threading head over the work piece and to return it to its initial position when the threading operation is completed, electrically actuated control means for the threading head fluid motor actuable to start said motor when the chuck moves into alignment with the head, switch means effective when the head approaches its initial position to actuate the chuck-moving motor and return the chuck to work piece receiving position, and means to release the threaded work piece for discharge.

4. In an electrically controlled nipple threading machine, the rotatable threading head, a pivotally mounted chuck means operable to deliver a work piece to be threaded to said chuck, an electrically controlled motor to operate said means, a motor operable to move the chuck from its work piece receiving position into position to align the work piece with the threading head, electrically actuated means for said chuck-moving motor actuable upon completion of the work piece feeding operation to start said motor, a third motor operable to advance the threading head over the work piece and to return it to its initial position when the threading operation is completed, electrically actuated control means for the threading head motor actuable to start said motor when the chuck moves into alignment with said head, and a switch engageable by and effective when the head approaches its initial position to actuate the chuck-moving motor to return the chuck to work receiving position.

5. In an electrically controlled nipple threading machine, a rotatable threading head, a pivotally mounted chuck movable into work receiving and work operating positions, a motor operable to move the chuck from its work receiving position into its work operating position to align a work piece therein with the threading head, a motor operable to advance the threading head over the work and to return it to its initial position when the threading operation is completed, electrically actuated control means for the threading head motor actuable to start said motor when the chuck moves into alignment with said head, and a switch engageable by and effective when the head approaches its initial position to actuate the chuck-moving motor to return the chuck to work receiving position.

6. In an electrically controlled nipple threading machine, a rotatable threading head, a chuck pivoted on a horizontal axis, means to deliver a work piece to be threaded to said chuck, an electrically controlled motor to operate said means, a motor operable to move the chuck from its work piece receiving position into position to align the work piece with the rotating threading head, electrically actuated control means for said chuck-moving motor actuable upon completion of the work piece feeding operation to start said motor, a third motor operable to advance the threading head over the work piece and to return it to its initial position when the threading operation is completed, electrically actuated control means for the threading head motor actuable to start said motor when the chuck moves into alignment with the head, switch means effective when the head approaches its initial position to actuate the chuck-moving motor and return the chuck to work piece receiving position, and means to release the threaded work piece for discharge.

DONALD D. R. MACKINTOSH.

References Cited in the file of this patent

UNITED STATES PATENTS

| Number | Name | Date |
|---|---|---|
| 665,506 | Carlson | Jan. 8, 1901 |
| 819,448 | Myers | May 1, 1906 |
| 1,069,995 | Anderson | Aug. 12, 1913 |
| 1,153,456 | Smith | Sept. 14, 1915 |
| 1,624,632 | Smith | Apr. 12, 1927 |
| 1,684,097 | Humphrey | Sept. 8, 1927 |
| 1,864,897 | Ewing | June 28, 1932 |
| 1,979,731 | Burge et al. | Nov. 6, 1934 |
| 1,998,873 | Kingsbury | Apr. 23, 1935 |
| 2,109,269 | Kohut | Feb. 22, 1938 |
| 2,206,031 | Drissner et al. | July 2, 1940 |
| 2,273,845 | Drissner et al. | Feb. 24, 1942 |
| 2,286,074 | Egger et al. | June 9, 1942 |
| 2,310,124 | Shartle | Feb. 2, 1943 |
| 2,490,841 | Smith | Dec. 13, 1949 |
| 2,514,775 | Mackintosh | July 11, 1950 |